(12) United States Patent
Dennis et al.

(10) Patent No.: US 6,834,838 B2
(45) Date of Patent: Dec. 28, 2004

(54) SELECTIVELY DEPLOYABLE CUPHOLDER

(75) Inventors: Robert P. Dennis, Royal Oak, MI (US); Martin A. Hogan, White Lake, MI (US); Yvonne F. Egbert, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 7 days.

(21) Appl. No.: 10/410,921

(22) Filed: Apr. 10, 2003

(65) Prior Publication Data

US 2004/0200941 A1 Oct. 14, 2004

(51) Int. Cl.$^7$ .................................................. A47K 1/08
(52) U.S. Cl. ................................... 248/311.2; 403/349
(58) Field of Search ........................... 248/311.2, 314; 224/926; 403/349

(56) References Cited

U.S. PATENT DOCUMENTS

| | | | | |
|---|---|---|---|---|
| 3,933,011 A | * | 1/1976 | DiGilio et al. ............... 63/29.1 |
| 4,040,549 A | * | 8/1977 | Sadler ........................ 224/483 |
| 4,784,112 A | * | 11/1988 | Hayashi ...................... 126/262 |
| 4,895,530 A | * | 1/1990 | Gugelmeyer et al. ....... 439/311 |
| 5,018,633 A | * | 5/1991 | Toth et al. ............... 248/311.2 |
| 5,102,085 A | * | 4/1992 | Wieczorek et al. ....... 248/311.2 |
| 5,143,338 A | * | 9/1992 | Eberlin ....................... 248/313 |
| 5,174,534 A | * | 12/1992 | Mitchell .................. 248/311.2 |
| 5,186,197 A | * | 2/1993 | Lavine ....................... 135/25.4 |
| 5,285,953 A | * | 2/1994 | Smith ......................... 220/737 |
| 5,366,084 A | * | 11/1994 | Post ........................... 206/319 |
| 5,483,808 A | * | 1/1996 | Barbazza ................... 63/15.5 |
| 5,988,917 A | * | 11/1999 | Sheffler et al. ............. 401/78 |

FOREIGN PATENT DOCUMENTS

CH    609432 A5 *  2/1979

* cited by examiner

*Primary Examiner*—Korie Chan
(74) *Attorney, Agent, or Firm*—Laura C. Hargitt (57) ABSTRACT

A selectively deployable cupholder that incorporates the best aspects of the static and active component cupholder designs, composed of stationary cylindrical component and a movable cylindrical component that is telescopically nested within the stationary cylindrical component. When the movable cylindrical component is in an undeployed state, whereat it is fully nested with respect to the stationary cylindrical component, a low vertical profile is provided, suitable for drawer applications. When the movable cylindrical component is in a deployed state, whereat it is fully telescopically raised relative to the stationary cylindrical component, the cupholder receives beverage containers with a stable support as is required for the automotive driving environment.

13 Claims, 6 Drawing Sheets

SELECTIVELY DEPLOYABLE CUPHOLDER

TECHNICAL FIELD

The present invention relates to automotive cupholders and particularly to a selectively deployable cupholder which is telescopically nestable and is adaptable for sliding drawer applications.

BACKGROUND OF THE INVENTION

Modern automotive interior design makes great strides to provide convenience for vehicle passengers. One of these conveniences is the cupholder for holding liquid filled beverage containers, with due regard for the inertial forces commonly involved with normal driving.

Numerous cupholder designs have been executed in a variety of automotive applications by a variety of manufacturers. These cupholder designs generally fall within one of two categories: static component cupholders and active component cupholders.

Static component cupholders generally involve molding a "pocket" into an automotive interior component, as for example a floor console, a door panel, etc, with sufficient diametric clearance and depth to accommodate a variety of commonly used beverage containers. While of low cost and durable, this type of cupholder generally does not provide an acceptable tradeoff between packaging space and cupholder functionality. Specifically, packaging space is negatively influenced as the "pocket" wall size dimensions are increased to provide sufficient depth for large beverage containers with high centers of gravity.

Active component cupholders generally involve multiple pieces that are attached by springs, pins, or other linkages which allow the individual components of the design to "nest" within each other, thereby optimizing packaging space. This cupholder design also allows for a wider size range of beverage containers by optimization of the component piece parts and the locational functionality of the springs, pins or other linkages within the design. However, the active component cupholder design is generally more expensive, more complex, more difficult to manufacture, and has poorer durability performance, as compared to static component cupholder designs.

Accordingly, what remains needed in the art is a cupholder design that is the best of the static and active component designs, providing an optimal balance between the imperatives of packaging space, cost, durability, and cupholder functionality for use in an automotive interior application, and further providing very compact storage of multiple, tall, and effective cupholders achieved with a minimal number of movable component parts.

SUMMARY OF THE INVENTION

The present invention is a selectively deployable cupholder that incorporates the best aspects of the static and active component designs, providing an optimal balance between the imperatives of packaging space, cost, durability, and cupholder functionality for use in an automotive interior application, and further providing very compact storage of multiple, tall, and effective cupholders achieved with a single movable component part. In this regard, the present invention, while falling within the active component cupholder category, overcomes the deficiencies associated with other designs in this category by avoiding the use of springs, pins, or other linkages.

The selectively deployable cupholder according to the present invention is composed of a stationary cylindrical (ring shaped) component and a movable cylindrical (ring shaped) component telescopically nested within the stationary cylindrical component. The stationary cylindrical component may be permanently connected, or removably connected, to a surrounding trim component, which may or may not supply the floor of the cupholder. When the movable cylindrical component is in an undeployed state, whereat it is fully nested with respect to the stationary cylindrical component, a low vertical profile is provided, suitable for drawer applications. When the movable cylindrical component is in a deployed state, whereat it is fully telescopically raised relative to the stationary cylindrical component, the cupholder receives beverage containers with a stable support therefor, as is required for use in an automotive driving environment.

The movable cylindrical component is provided with a plurality of bosses emanating from its outer wall surface adjacent the lower end thereof. The stationary cylindrical component has a plurality of tracks formed into an inner wall surface, one for each boss. Each boss is received into its respective track, wherein the tracks guide telescopic movement of the movable cylindrical component with respect to the stationary cylindrical component. An upper detent and a lower detent are provided at each track for defining the upper and lower telescopic limits of travel of the movable cylindrical component with respect to the stationary cylindrical component via the bosses, respectively. In this regard, each detent and its respective boss interact in a resilient manner so as to provide a snapping location of the boss in the detent which is detectable by the user, wherein this feedback provides user awareness of achievement of each limit of telescopic travel.

Accordingly, it is an object of the present invention to provide a cupholder having only a single moving component part which provides the best aspects of both the static component and active component cupholder designs.

It is an additional object of the present invention to provide a cupholder having only a single moving compoinent part which provides the best aspects of both the static component and active component cupholder designs, wherein the cupholder is adapatable for use with a sliding drawer which is slidably stowable.

These and additional objects, features and advantages of the present invention will become clearer from the following specification of a preferred embodiment.

DESCRIPTION OF THE PREFERRED EMBODIMENT

Figure 1A:
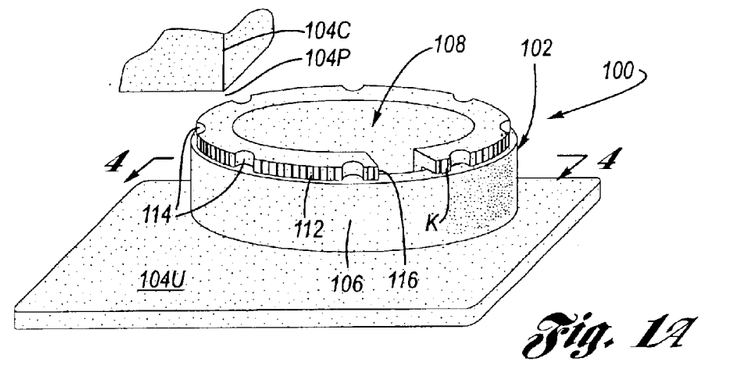
FIG. 1A is a perspective view of the selectively deployable cupholder according to the present invention, shown in the undeployed state and integrally formed at a top surface of an automotive trim component.
Figure 1B:
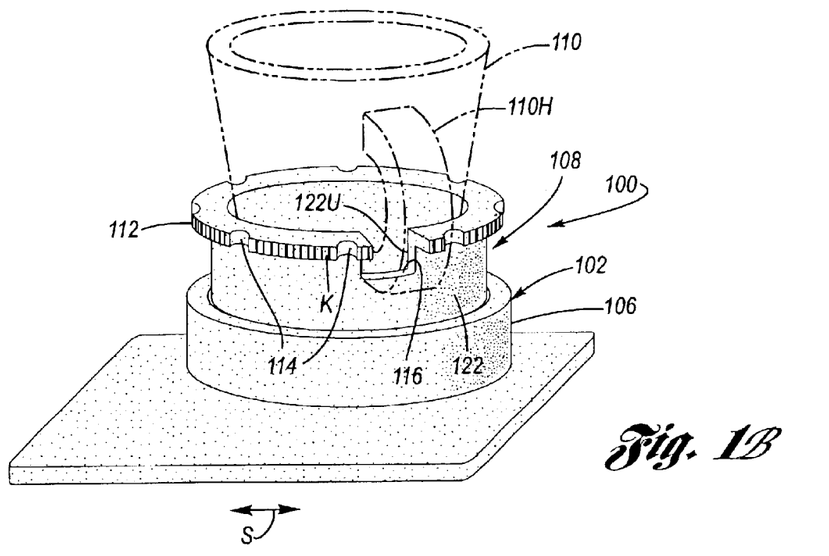
FIG. 1B is a perspective view of the selectively deployable cupholder according to the present invention, shown in the deployed state and operatively with respect to the automotive trim component and a beverage container.
Figure 4:
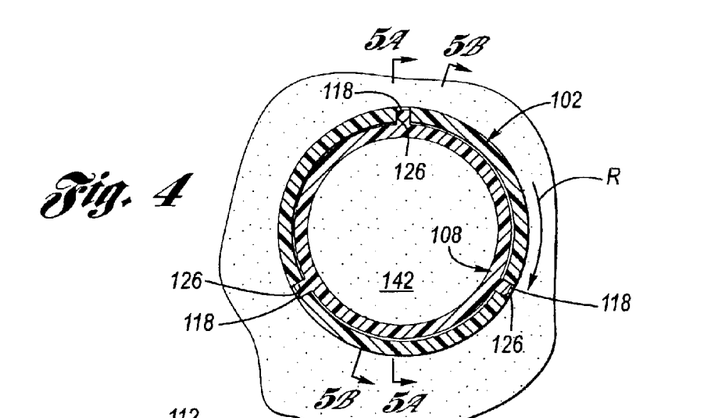
FIG. 4 is a partly sectional view, seen along line 4—4 of FIG. 1A.

Referring now to the Drawing, FIGS. 1A and 1B depict an example of a selectively deployable cupholder 100 according to the present invention. A stationary cylindrical component 102 is either intergrally connected (for example by injection molding) or attachably connected (for example by sonic welding or adhesive) to an upper surface 104U of an automotive trim component 104. The automotive trim component is, by way of example, a drawer which slides (see arrow S) in and out of an opening 104P of another trim component, such as for example a console 104C. The stationary cylindrical wall 106 of the stationary cylindrical component is in upstanding relation to the upper surface 104U. A lower end 106L of the stationary cylindrical wall 106 is connected to a floor. The floor may be, for example integral with the trim component or integral with the stationary cylindrical wall, and may be continuous (see 142 of FIG. 4), or may be discontinuous (for example, having a central opening with a perimeter ledge for engaging a beverage container). A movable cylindrical component 108 is telescopically nested inside the stationary cylindrical component 102, and is telescopically movable with respect to the stationary cylindrical component from an undeployed state, as shown at FIG. 1A, to a deployed state, as shown at FIG. 1B.

Figures 5A, 5B:
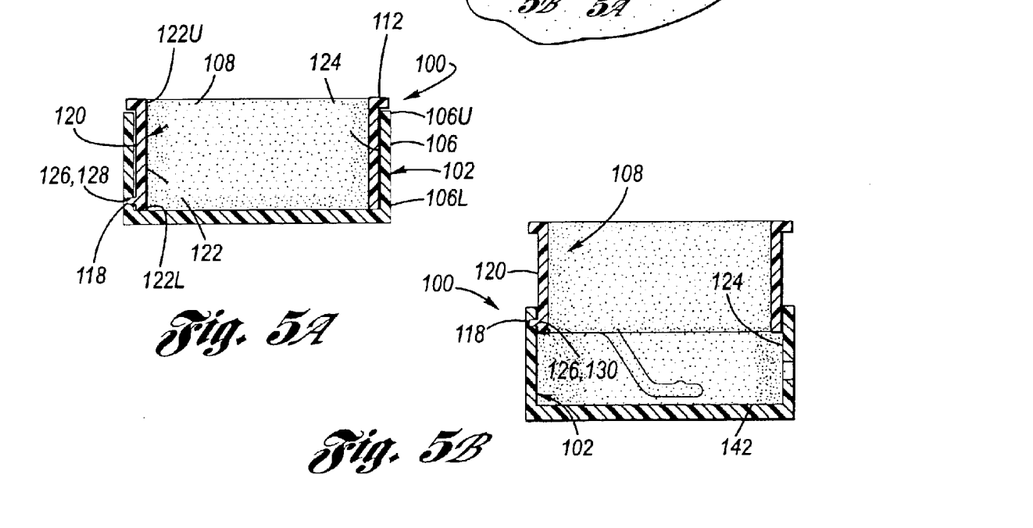
FIG. 5A is a sectional view, seen along line 5A—5A of FIG. 4.
FIG. 5B is a sectional view, seen along line 5B—5B of FIG. 4.

When in the undeployed state, the selectively deployable cupholder 100 has a very low vertical silhouette in that the movable cylindrical component 108 is nested fully into the stationary cylindrical component 102 (to the extent of all but a lip 112 of the movable cylindrical component), which allows for an unobstructed and unobtrusive presence in the passenger compartment of a motor vehicle, and further is nicely adaptable for placement at a drawer which is slidably stowable into, for example, a console. When at the deployed state, the depth provided by the vertical combination of the stationary and movable cylindrical components 102, 108 provides excellent support for a beverage container 110 with good stability even as customary inertial forces are encountered during driving. In this regard, the beverage container rests upon the floor (see the floor 142 at FIGS. 4 and 5B).

The lip 112 (which is preferred, but optional) of the movable cylindrical component 108 may include circumferential knurling K or indents 114 to aid a user to grip the lip and thereby execute its rotation during telescoping of the movable cylindrical component 108 relative to the stationary cylindrical component 102. A notch 116 may be provided in the movable cylindrical component 108 at the movable cylindrical wall 122 adjacent the upper end 112U thereof, inclusive of the lip 112, for receiving a handle 110H of the beverage container 110.

Figure 2:
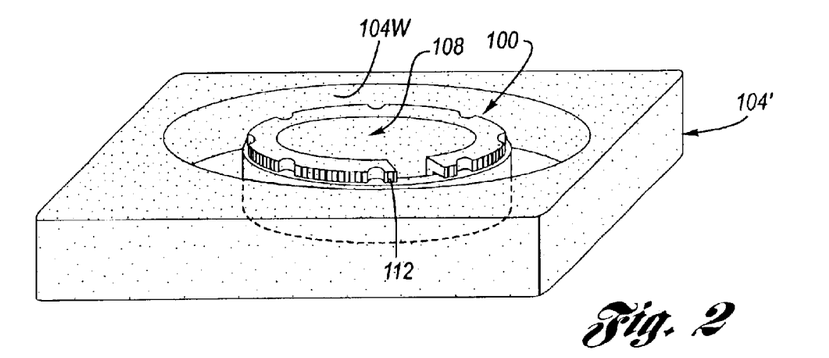
FIG. 2 is a perspective view of the selectively deployable cupholder according to the present invention, shown in the undeployed state and integrally formed at the bottom of a well of another automotive trim component.

FIG. 2 depicts a variation of FIGS. 1A and 1B, in that an automotive trim component 104' now has a significant thickness such that the selectively deployable cupholder 100 is located within a well 104W of the trim component. Preferably, the well 104W has sufficient depth to completely receive the vertical height of the selectively deployable cupholder 100 when in the undeployed state, as shown at FIG. 2. The well 104W has a generous diameter which is sufficiently larger than the diameter of the lip 112 such that a person may easily place his/her fingers/thumb onto the lip to cause deployment of the moveable cylindrical component 108 without interference by the trim component 104'.

A preferred structure for carrying out the telescopic movement of the movable cylindrical component 108 relative to the stationary cylindrical component 102 according to a first embodiment of the present invention will now be described with additional reference to FIGS. 3 through 9.

Figure 3:
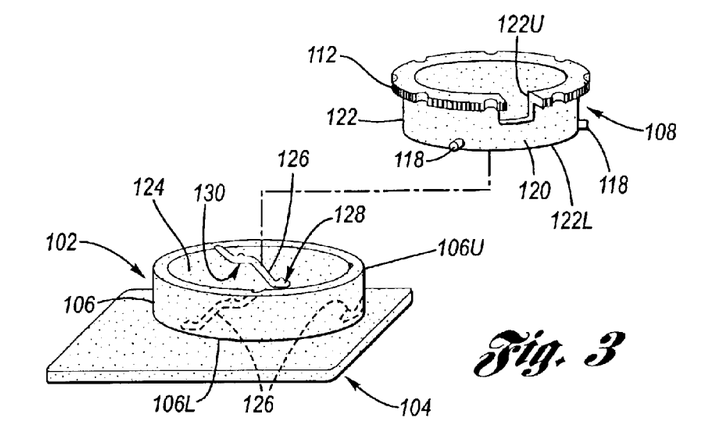
FIG. 3 is an exploded perspective view of the selectively deployable cupholder according to a first embodiment of the present invention, wherein the bosses are static and the detents are resilient.
Figure 6:
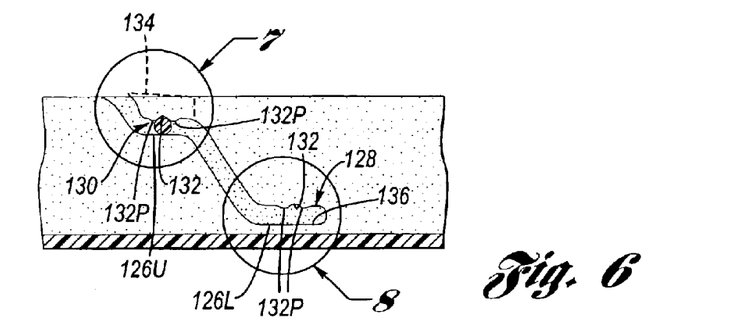
FIG. 6 is a fragmentary, partly sectional side view of the inside wall surface of a stationary cylindrical component according to the first embodiment of the present invention, showing in particular a track thereof.

As best shown at FIG. 3, the movable cylindrical component 108 is provided with a plurality of bosses 118 emanating, in perpendicular relation, from the outer wall surface 120 of the movable cylindrical wall 122 adjacent the lower end 122L thereof. The inner wall surface 124 of the stationary cylindrical wall 106 of the stationary cylindrical component 102 has a plurality of tracks 126 having a concave track wall 126W formed thereinto, one track, respectively, for each boss 118. As best shown at FIG. 6, each track 126 is helically oriented from a lower horizontal track section 126L, whereat is a lower detent 128 located adjacent the lower end 106L of the stationary cylindrical wall 106, to an upper horizontal track section 126U, whereat is an upper detent 130 located adjacent an upper end 106U of the stationary cylindrical wall. The helical orientation of the tracks 126 provides a guide path for the movable cylindrical component 108 to be rotated while being telescopically raised/lowered relative to the stationary cylindrical component 102. Each boss 118 is received into its respective track 126, wherein the tracks guide rotation R (see FIG. 4) and telescopic movement of the movable cylindrical component 108 with respect to the stationary cylindrical component 102, as can be understood by referencing FIGS. 4 through 5B, wherein there is a freely slidable fit between the inner wall surface 124 and the outer wall surface 120 (see FIGS. 5A and 5B).

In the example shown, three bosses 118 are provided, equally spaced around the perimeter of the outer wall surface 120, and three corresponding tracks 126 are provided also equally spaced around the perimeter of the inner wall surface 124. Three bosses/tracks 118/126 are preferred as this distributed number provides a three dimensional guidance of the movable cylindrical component 108, although the number may be other than three.

The lower and upper detents 128, 130 are provided at each track for defining the lower and upper telescopic limits of travel, respectively, of the movable cylindrical component 108 with respect to the stationary cylindrical component 102. In this regard, each detent 128, 130 has a concavity 132 which provides a snapping placement thereinto of its respective boss 118, whereby the user detects (feelingly and, if so designed, audibly), in a feedback manner, achievement of a limit of telescopic travel.

Figure 7:
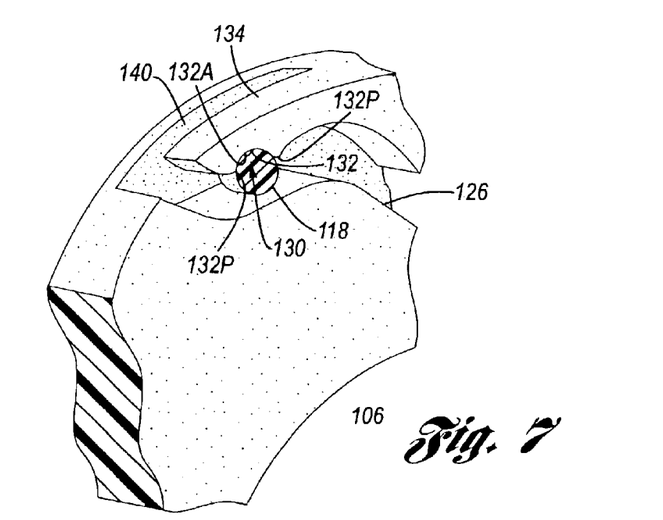
FIG. 7 is a fragmentary, partly sectional, perspective view, seen at circle 7 of FIG. 6.
Figure 8:
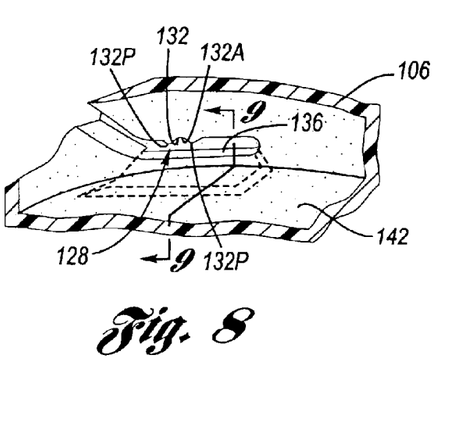
FIG. 8 is a fragmentary, partly sectional, perspective view, seen at circle 8 of FIG. 6.

As shown at FIGS. 6, 7 and 8, the concavity 132 is, in one form, provided by a pair of mutually separated protuberances 132P and is sized with respect to the cross-section of the track 126 so as to fully receive the boss 118 without strain, whereby plastic creep is prevented at the lower and upper detents 128, 130. In this regard, the width of the tracks 126 is preferably just about the diameter of the bosses 118, the diameter of the tracks at the protuberances 132P is less than the diameter of the bosses, and the diameter of the track at the apex 132A of the concavity 132 is at least equal to the diameter of the bosses. As shown at FIG. 3, it is also contemplated to provide a width of the tracks 126 sufficiently less than the diameter of the bosses 118 that the snapping action at the detents 128, 130 occurs without the presence of the protuberances, again, the tracks at the concavities being at least as wide as the diameter of the detents.

Figure 9:
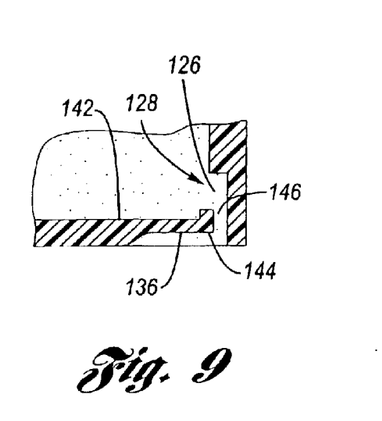
FIG. 9 is a fragmentary, sectional view, seen along line 9—9 of FIG. 8.

The snapping action of the lower and upper detents 128, 130 is provided by upper and lower resilient fingers 134, 136, respectively flexing as the bosses 118 move past the protuberances 132P. The upper resilient finger 134 is shown at FIG. 7, wherein a cut-out 140 is provided in the wall of the stationary cylindrical component 102 which communicates with the adjoining track 126. The lower resilient finger 136 is shown at FIGS. 8 and 9, wherein a floor 142 of the stationary cylindrical component 102 has a reduced thickness portion 144 at a cut-out 146 that communicates with the adjoining track 126.

Figure 10:
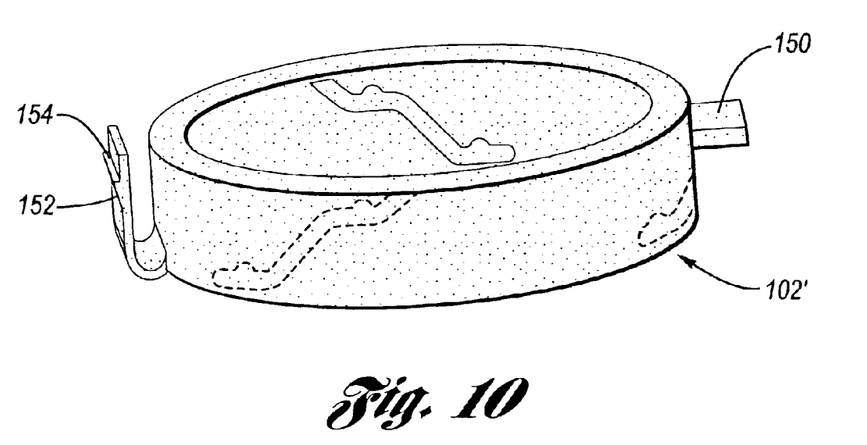
FIG. 10 is a perspective view of a stationary cylindrical component according to the first embodiment of the present invention adapted for removable interface with respect to a complementary trim component.
Figure 11:
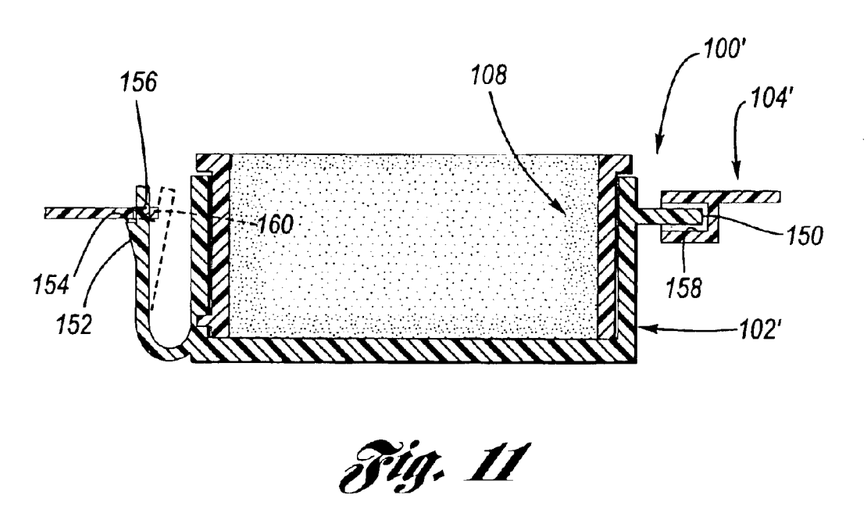
FIG. 11 is a sectional side view of the stationary cylindrical component of FIG. 10, seen removably interfaced with a complementary trim component.

FIGS. 10 and 11 depict a variation in the selectively deployable cupholder 100' according to the present invention, wherein the stationary cylindrical component 102' is removably seated with respect to a complementary trim component 104". Removability of the stationary cylindrical component 102' affords the user an easy methodology for cleaning in the event of an inadvertent beverage spillage. In the example depicted, a tab 150 is provided in perpendicular relation to an outside wall surface of the stationary cylindrical component 102'.

Oppositely positioned on the outside wall surface is a resilient arm 152, including a barb 154. In operation, the complementary trim component 104" has an opening 156 into which is received the stationary cylindrical component 102', wherein a pocket 158 of the trim component firstly receives the tab 150 and thereafter the barb resiliently locks into an oppositely located slot 160. The pocket 158 and the slot 160 prevent rotation of the stationary cylindrical component by interference with the tab 150 and the resilient arm 152, respectively.

The hereinabove recounted first embodiment of the present invention involved static bosses on the movable cylindrical component and resilient detents on the stationary cylindrical component, wherein the detents have an axial orientation with respect to the tracks (by "axial orientation" is meant that the concavity is formed in the tracks parallel to the cylindrical axis of the movable cylindrical member). Hereinbelow is recounted a second preferred embodiment of the present invention, wherein the bosses are resilient on the movable cylindrical component and the detents are static on the stationary cylindrical component, wherein the detents have a radial orientation with respect to the tracks (by "radial orientation" is meant that the concavity is formed in the tracks radial to the cylindrical axis of the movable cylindrical member).

Figure 12:
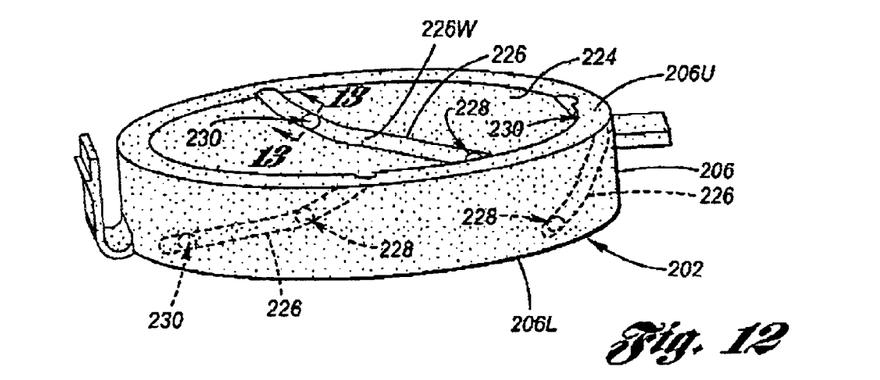
FIG. 12 is a perspective view of a stationary cylindrical component according to a second embodiment of the present invention for operation with respect to static detents and resilient bosses, a removable configuration, similar to that of FIG. 10, being exemplarly shown.

FIG. 12 depicts an example of the static cylindrical component 202 according to the second embodiment of the present invention. While a removable version is shown which operates with respect to a complementary trim component similarly to that described with respect to FIGS. 10 and 11, the stationary cylindrical component 202 may be configured with respect to trim components similar to that described with respect to FIGS. 1A through 4.

Figure 13:
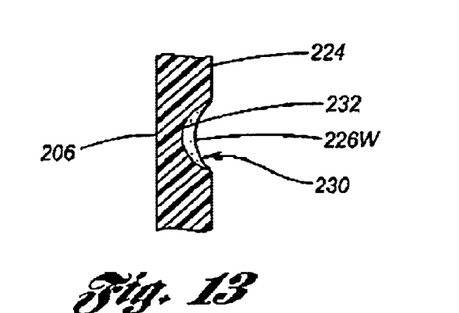
FIG. 13 is a partly sectional view, seen along line 13—13 of FIG. 12.

The static cylindrical component 202 now has tracks 226 formed in the inner wall surface 224 of the stationary cylindrical wall 206 which are differently configured from the tracks 126 depicted in the first embodiment. In this regard, each track 226 has a concave shaped wall 226W, and is helically oriented from adjacent an upper end 206U of the stationary cylindrical wall 206 to adjacent a lower end 226L of the stationary cylindrical wall (without the upper and lower horizontal sections of the first embodiment), wherein the lower and upper detents 228, 230 are semi-circular concavities 232 which are deeper than the concave shaped wall 226W (as shown best at FIG. 13). As mentioned hereinabove with respect to the first embodiment of the present invention, three tracks 226 are preferred.

FIGS. 14 through 21 depict two variations of the movable cylindrical component 208, 208', wherein the bosses 218 thereof are resilient.

Figure 14:
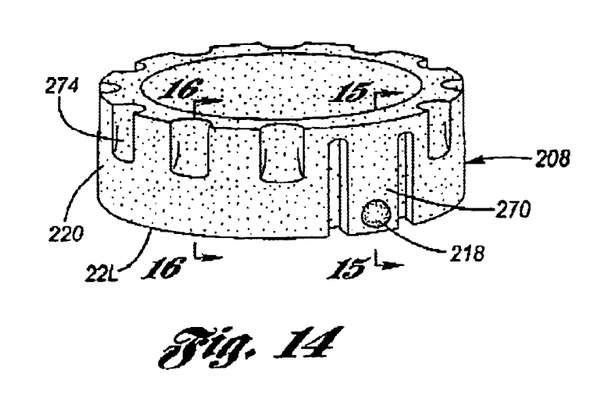
FIG. 14 is a perspective view of a first version of movable cylindrical component according to the second embodiment of the present invention.
Figure 15:
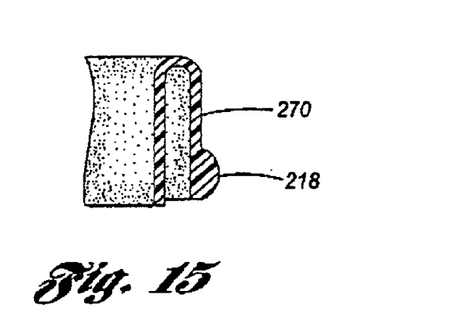
FIG. 15 is a partly sectional view, seen along line 15—15 of FIG. 14.

FIG. 14 depicts a variation of the movable cylindrical component 208 in which the bosses 218 are radially resilient, via each boss 218 being mounted at a distal end of a vertically oriented resilient arm 270, whereby the boss is located adjacent the lower end 222L of the movable cylindrical wall 222, as shown additionally by FIG. 15. One boss 218 is provided for each track 226.

Figure 16:
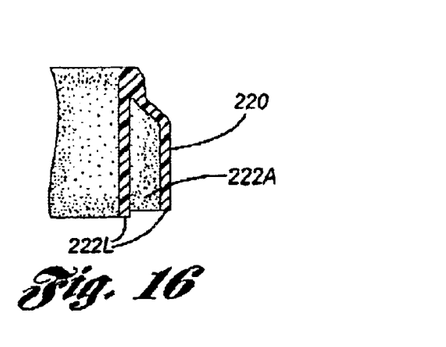
FIG. 16 is a partly sectional view, seen along line 16—16 of FIG. 14.

FIG. 16 depicts that the movable cylindrical wall 222 is U-shaped, having an annular spacing 222S at the lower end 222L, and such that the outer wall surface 220 is flush with the resilient arm 270. The spacing 222S allows for radially resilient movement of the bosses.

Figure 17:
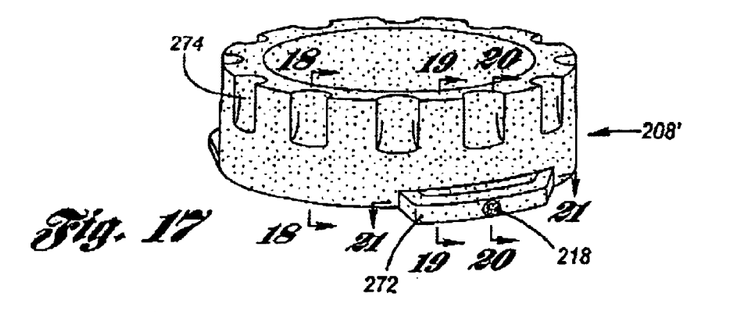
FIG. 17 is a perspective view of a second, most preferred, version of movable cylindrical component according to the second embodiment of the present invention.
Figure 18:
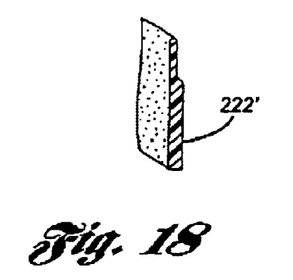
FIG. 18 is a partly sectional view, seen along line 18—18 of FIG. 17.
Figure 19:
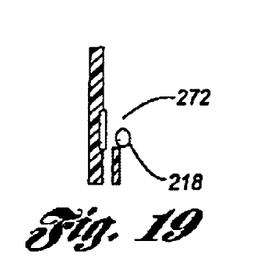
FIG. 19 is a partly sectional view, seen along line 19—19 of FIG. 17.
Figure 20:
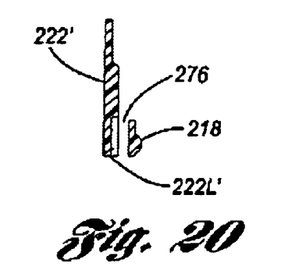
FIG. 20 is a partly sectional view, seen along line 20—20 of FIG. 17.
Figure 21:
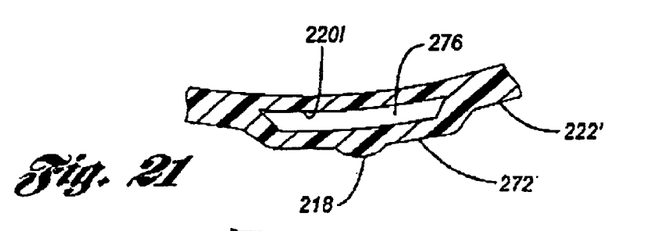
FIG. 21 is a sectional view, seen along line 21—21 of FIG. 17.

FIG. 17 depicts another variation of the movable cylindrical component 208' in which the bosses 218 are radially resilient, via each boss being mounted centrally upon a tangentially oriented resilient arm 272 which is connected at each end to the movable cylindrical wall 222' (alternatively, only one end of the resilient arm may be connected). Each boss 218 is located adjacent the lower end 222L' of the movable cylindrical wall 222', as shown additionally by FIG. 20. As shown best by FIGS. 19 and 21, the resilient arm 272 is separated from the outer wall surface 220' at an indentaton 220I thereof. The separation 276 allows for the radially resilient movement of the bosses. FIG. 21 depicts the resilient arm 272 in a relaxed state. One boss 218 is provided for each track 226.

Figures 22, 23:
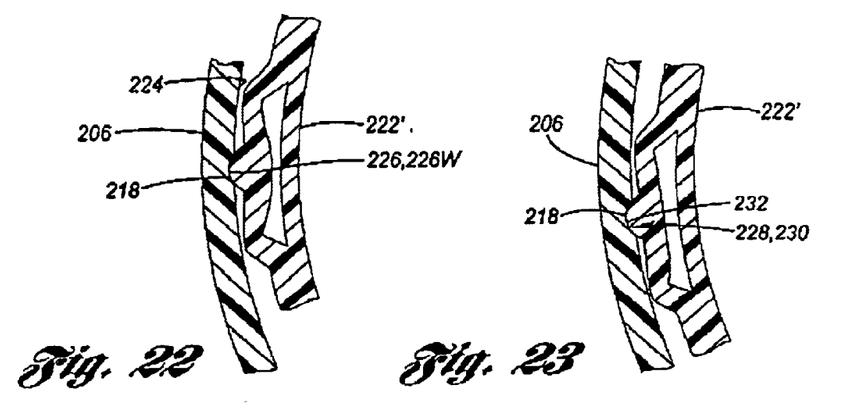
FIG. 22 is a sectional view, showing track and boss interaction according to the second embodiment of the present invention.
FIG. 23 is a sectional view, showing detent and boss interaction according to the second embodiment of the present invention.

FIG. 22 depicts the interaction between the concavely shaped wall 226W of a track 226 and a boss 218. FIG. 23, on the other hand, depicts the boss 218 now located at a semi-circular concavity 232 of a detent 228, 230. It will be noted that FIG. 22 depicts a first flexed state of the resilient arm and FIG. 23 depicts a second flexed state of the resilient arm, wherein the first flexed state (of FIG. 22) is more flexed than the second flexed state (of FIG. 23), and the second flexed state is somewhat flexed relative to the relaxed state (of FIG. 21), which is unflexed.

Since the concavity 232 of the detents 228, 230 are concavely semi-circular, since the bosses 218 are convexly semi-circular, and since the flexible arms are flexed in the first state at the tracks and flexed in the second state at the detents, the bosses tend to snappingly center into the detents in a manner detectable to the user as the user rotates the movable cylindrical component relative to the stationary cylindrical component.

It will be noted from inspection of FIGS. 14 and 17 that a lip is absent, whereas present is a series of regularly spaced indents 274. While a lip may be applicable to the movable cylindrical component 208, 208' of the second embodiment, likewise the absence of a lip is applicable to the movable cylindrical component 108 of the first embodiment.

A preferred material for the stationary and movable cylindrical components is a low friction plastic material, such as acetal.

The tracks 126, 226 may be open at the upper end of the stationary cylindrical wall, as shown for example at FIGS. 6 and 12, or may be closed as shown at FIG. 10. In the event the tracks are closed, the bosses are press fit into the tracks at the time of manufacture.

While a single selectively deployable cupholder has been shown relative to a trim component, it is preferred to provide a set of two selectively deployable cupholders.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A selectively deployable cupholder, comprising:
   a stationary cylindrical component having a stationary cylindrical wall defining an inner wall surface, a plurality of tracks being formed in said inner wall surface, a floor being connected to said stationary cylindrical wall at a lower end thereof; and
   a movable cylindrical component having a movable cylindrical wall defining an outer wall surface, said movable cylindrical component being telescopically nested with respect to said stationary cylindrical component, a plurality of bosses emanating from said outer wall surface, one boss for each track, respectively;
   wherein each said boss is received in a respective said track such that said plurality of tracks guide telescopic movement of the movable cylindrical component with respect to the stationary cylindrical component between an undeployed state and a deployed state; and
   wherein said stationary cylindrical wall has an upper end and the opposite lower end; wherein said cupholder further comprises:
      an upper detent formed in each said track adjacent said upper end, respectively; and
      a lower detent formed in each said track adjacent said lower end, respectively;
      wherein each said upper detent receives a respective said boss to thereby define said deployed state, and wherein each said lower detent receives a respective said boss to thereby define said undeployed state;
   wherein each said tack is helically oriented, wherein each said track extends between substantially said upper end and said lower end of said stationary cylindrical wall;
   wherein said movable cylindrical wall has a lower end, wherein said plurality of bosses are located adjacent said lower end of said movable cylindrical wall; and
   wherein each said upper detent comprises a first concavity of a respective said track carried on a respective upper resilient arm formed in said stationary cylindrical wall; and wherein each said lower detent comprises a second concavity of a respective said track carried on a respective lower resilient arm formed in said floor.

2. The cupholder of claim 1, wherein said plurality of bosses comprises three bosses substantially equidistantly distributed circumferentially on said outer wall surface of said movable cylindrical wall.

3. A selectively deployable cupholder and trim component, comprising:
   a stationary cylindrical component having a stationary cylindrical wall defining an inner wall surface, a plurality of tracks being formed in said inner wall surface, a floor being connected to said stationary cylindrical wall at a lower end thereof;
   a movable cylindrical component having a movable cylindrical wall defining an outer wall surface, said movable cylindrical component being telescopically nested with respect to said stationary cylindrical component, a plurality of bosses emanating from said outer wall surface, one boss for each track, respectively; and
   a trim component connected to said stationary cylindrical wall;
   wherein each said boss is received in a respective said track such that said plurality of tracks guide telescopic movement of the movable cylindrical component with respect to the stationary cylindrical component between an undeployed state and a deployed state; and
   wherein said stationary cylindrical wall has an upper end and the opposite lower end, wherein said cupholder further comprises:
      an upper detent formed in each said track adjacent said upper end, respectively; and
      a lower detent formed in each said track adjacent said lower end, respectively;
      wherein each said upper detent receives a respective said boss to thereby define said deployed state, and wherein each said lower detent receives a respective said boss to thereby define said undeployed state;

wherein each said track is helically oriented, wherein each said track extends between substantially said upper end and said lower end of said stationary cylindrical wall;

wherein said movable cylindrical wall has a lower end, wherein said plurality of bosses are located adjacent said lower end of said movable cylindrical wall; and wherein each said upper detent comprises a first semi-circular concavity of a respective said track formed in said stationary cylindrical walls; and wherein each said lower detent comprises a second semi-circular concavity of a respective said track formed adjacent said floor.

4. The cupholder and trim component of claim 3, wherein said plurality of bosses comprises three bosses substantially equidistantly distributed circumferentially on said outer wall surface of said movable cylindrical wall.

5. The cupholder of claim 4, wherein said stationary cylindrical component is removably interfaced with respect to said trim component.

6. The cupholder of claim 4, wherein said trim component is a slidable drawer.

7. The cupholder and trim component of claim 3, wherein each said boss is carried on a respective resilient arm connected with said movable cylindrical wall.

8. The cupholder of claim 7, wherein said plurality of bosses comprises three bosses substantially equidistantly distributed circumferentially on said outer wall surface of said movable cylindrical wall.

9. The cupholder of claim 8, wherein said stationary cylindrical component is removably interfaced with respect to said trim component.

10. The cupholder of claim 8, wherein said trim component is a slidable drawer.

11. A selectively deployable cupholder and trim component, comprising:

a cupholder comprising:
  a stationary cylindrical component having a stationary cylindrical wall defining an inner wall surface, a plurality of tracks being formed in said inner wall surface, a floor being connected to said stationary cylindrical wall at a lower end thereof; and
  a movable cylindrical component having a movable cylindrical wall defining an outer wall surface, said movable cylindrical component being telescopically nested with respect to said stationary cylindrical component, a plurality of bosses emanating from said outer wall surface, one boss for each track, respectively;

wherein each said boss is received in a respective said track such that said plurality of tracks guide telescopic movement of the movable cylindrical component with respect to the stationary cylindrical component between an undeployed state and a deployed state;

wherein said stationary cylindrical wall has an upper end and the opposite lower end; wherein said cupholder further comprises:
  an upper detent formed in each said track adjacent said upper end, respectively; and
  a lower detent formed in each said track adjacent said lower end, respectively;

wherein each said upper detent receives a respective said boss to thereby define said deployed state, and wherein each said lower detent receives a respective said boss to thereby define said undeployed state;

a trim component; and a resilient lock interface between said trim component and said stationary cylindrical component which selectively connects said cup holder to said trim component such that said stationary cylindrical component is nonrotatable with respect to said trim component, wherein said resilient lock interface is resiliently deformable to selectively release the connection of said cup holder with respect to said trim component.

12. The cupholder and trim component of claim 11, wherein said trim component is a slidable drawer.

13. The cupholder and trim component of claim 11, wherein each said upper detent comprises a first concavity of a respective said track carried on a respective upper resilient arm formed in said stationary cylindrical wall; and wherein each said lower detent comprises a second concavity of a respective said track carried on a respective lower resilient arm formed in said floor.

* * * * *